US012772047B2

(12) United States Patent
Ali et al.

(10) Patent No.: US 12,772,047 B2
(45) Date of Patent: Oct. 20, 2026

(54) CAPABILITY INFORMATION TRANSMISSION

(71) Applicant: Nokia Technologies Oy, Espoo (FI)

(72) Inventors: Amaanat Ali, Espoo (FI); Jerediah Fevold, Chicago, IL (US); Sari Kaarina Nielsen, Espoo (FI); Mahmood Reza Alizadeh Ashrafi, Espoo (FI); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 236 days.

(21) Appl. No.: 18/798,910

(22) Filed: Aug. 9, 2024

(65) Prior Publication Data

US 2025/0056211 A1 Feb. 13, 2025

Related U.S. Application Data

(60) Provisional application No. 63/518,817, filed on Aug. 10, 2023.

(51) Int. Cl.
*H04W 8/24* (2009.01)
*H04W 88/06* (2009.01)

(52) U.S. Cl.
CPC .............. *H04W 8/24* (2013.01); *H04W 88/06* (2013.01)

(58) Field of Classification Search
CPC ................................ H04W 8/24; H04W 88/06
See application file for complete search history.

(56) References Cited

U.S. PATENT DOCUMENTS

2023/0100253 A1* 3/2023 Zhu ...................... G06N 3/0464 706/26
2024/0172080 A1 5/2024 Ali et al.

FOREIGN PATENT DOCUMENTS

WO 2022/013104 A1 1/2022
WO 2022/028664 A1 2/2022
WO 2022/077202 A1 4/2022
(Continued)

OTHER PUBLICATIONS

"New SI: Study on Artificial Intelligence (AI)/Machine Learning (ML) for NR Air Interface", 3GPP TSG RAN Meeting #94e, RP-213599, Qualcomm, Agenda Item: 8.6.1, Dec. 6-17, 2021, 6 pages.
(Continued)

*Primary Examiner* — Myron Wyche
(74) *Attorney, Agent, or Firm* — Barta Jones, PLLC

(57) ABSTRACT

Example embodiments of the present disclosure relate to methods, devices, apparatuses and computer readable storage medium for capability information transmission. In a method, a first apparatus receives, from a second apparatus, a capability enquiry comprising Machine Learning (ML) capabilities with one or more applicable conditions and an indication requesting the first apparatus to indicate support of at least one activation condition for the applicable conditions. The first apparatus transmits, to the second apparatus, capability information comprising the applicable conditions and the at least one activation condition for the applicable conditions. The at least one activation condition indicates whether a corresponding applicable condition is currently supported or not supported.

20 Claims, 9 Drawing Sheets

BM-CASE1
(SPATIAL BEAM PREDICTION)

(56) References Cited

FOREIGN PATENT DOCUMENTS

WO 2023/277780 A1 1/2023

OTHER PUBLICATIONS

"3rd Generation Partnership Project; Technical Specification Group Radio Access Network; NR; NR and NG-RAN Overall Description; Stage 2 (Release 17)", 3GPP TS 38.300 V17.4.0, Mar. 2023, pp. 1-210.
"3rd Generation Partnership Project; Technical Specification Group Radio Access Network; NR; Radio Resource Control (RRC) protocol specification (Release 17)", 3GPP TS 38.331 V17.4.0, Mar. 2023, pp. 1-1324.
"General Aspects of AI/ML Framework", 3GPP TSG-RAN WG1 Meeting #112-bis-e, R1-2303581, Qualcomm Incorporated, Agenda item: 9.2.1, Apr. 17-26, 2023, pp. 1-30.
"Discussion on Life Cycle Management", 3GPP TSG-RAN WG2 Meeting #122, R2-2305973, Qualcomm Incorporated, Agenda Item: 7.16.2.4, May 22-26, 2023, 9 pages.
"Further discussion on the general aspects of ML for Air-interface", 3GPP TSG RAN WG1 #112bis-e, R1-2302627, Nokia, Agenda item: 9.2.1, Apr. 17-26, 2023, 12 pages.
"IEEE 802.11", Wikipedia, Retrieved on Jul. 8, 2025, Webpage available at: https://en.wikipedia.org/wiki/IEEE_802.11.

* cited by examiner

CAPABILITY INFORMATION TRANSMISSION

FIELDS

Various example embodiments of the present disclosure generally relate to the field of telecommunication and in particular, to methods, devices, apparatuses and computer readable storage medium for capability information transmission.

BACKGROUND

In some communication systems such as the next cellular systems, artificial intelligence (AI) and/or machine learning (ML) technology is proposed to be used in order to improve the communication performance. An AI/ML model may be applied in the new radio (NR) radio interface to assist model functionalities or communication-related functions, such as, channel state information (CSI) overhead reduction, beam management (BM), positioning, and the like. For example, the AI/ML-based beam management targets spatial and/or time beam prediction for overhead and latency reduction. The AI/ML based functions such as air-interface functions need to enhance/augment the air-interface with features enabling improved support of AI/ML-based algorithms for enhanced performance and/or reduced complexity/overhead—the enhanced performance here depends on the considered use cases and could be, e.g., improved throughput, robustness, accuracy or reliability, etc.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a second apparatus, a capability enquiry comprising Machine Learning, ML, capabilities with one or more applicable conditions and an indication requesting the first apparatus to indicate support of at least one activation condition for the applicable conditions; and transmit, to the second apparatus, capability information comprising the applicable conditions and the at least one activation condition for the applicable conditions, the at least one activation condition indicating whether a corresponding applicable condition is currently supported or not supported.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, a capability enquiry comprising Machine Learning, ML, capabilities with one or more applicable conditions and an indication requesting the first apparatus to indicate support of at least one activation condition for the applicable conditions; and receive, from the first apparatus, capability information comprising the applicable conditions and the at least one activation condition for the applicable conditions, the at least one activation condition indicating whether a corresponding applicable condition is currently supported or not supported.

In a third aspect of the present disclosure, there is provided a method. The method comprises: receiving, at a first apparatus from a second apparatus, a capability enquiry comprising Machine Learning, ML, capabilities with one or more applicable conditions and an indication requesting the first apparatus to indicate support of at least one activation condition for the applicable conditions; and transmitting, to the second apparatus, capability information comprising the applicable conditions and the at least one activation condition for the applicable conditions, the at least one activation condition indicating whether a corresponding applicable condition is currently supported or not supported.

In a fourth aspect of the present disclosure, there is provided a method. The method comprises: transmitting, at a second apparatus to a first apparatus, a capability enquiry comprising Machine Learning, ML, capabilities with one or more applicable conditions and an indication requesting the first apparatus to indicate support of at least one activation condition for the applicable conditions; and receiving, from the first apparatus, capability information comprising the applicable conditions and the at least one activation condition for the applicable conditions, the at least one activation condition indicating whether a corresponding applicable condition is currently supported or not supported.

In a fifth aspect of the present disclosure, there is provided a first apparatus. The first apparatus comprises means for receiving, from a second apparatus, a capability enquiry comprising Machine Learning, ML, capabilities with one or more applicable conditions and an indication requesting the first apparatus to indicate support of at least one activation condition for the applicable conditions; and means for transmitting, to the second apparatus, capability information comprising the applicable conditions and the at least one activation condition for the applicable conditions, the at least one activation condition indicating whether a corresponding applicable condition is currently supported or not supported.

In a sixth aspect of the present disclosure, there is provided a second apparatus. The second apparatus comprises means for transmitting, to a first apparatus, a capability enquiry comprising Machine Learning, ML, capabilities with one or more applicable conditions and an indication requesting the first apparatus to indicate support of at least one activation condition for the applicable conditions; and means for receiving, from the first apparatus, capability information comprising the applicable conditions and the at least one activation condition for the applicable conditions, the at least one activation condition indicating whether a corresponding applicable condition is currently supported or not supported.

In a seventh aspect of the present disclosure, there is provided a computer readable medium. The computer readable medium comprises instructions stored thereon for causing an apparatus to perform at least the method according to the third or the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
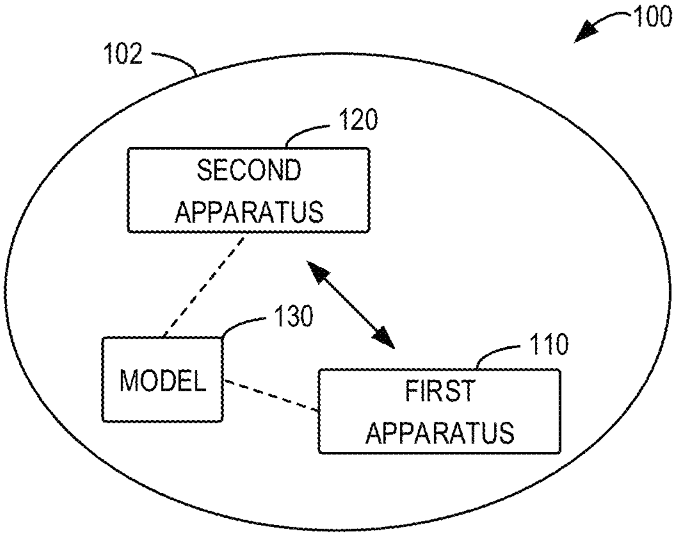
FIG. 1A to FIG. 1C illustrate example communication environments in which example embodiments of the present disclosure can be implemented, respectively.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (NodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "model" is referred to as an association between an input and an output learned from training data, and thus a corresponding output may be generated for a given input after the training. The generation of the model may be based on a ML technique. The ML techniques may also be referred to as AI techniques. In general, a ML model can be built, which receives input information and makes predictions based on the input information. As used herein, a model is equivalent to an AI/ML model or a ML model, or a data-driven/data processing algorithm/procedure.

As used herein, the term "data collection" is referred to as a process of collecting data by the network nodes, management entity, or UE for the purpose of AI/ML model training, data analytics and inference.

As used herein, the term "AI/ML Model" is referred to as a data driven algorithm that applies AI/ML techniques to generate a set of outputs based on a set of inputs.

As used herein, the term "AI/ML model training" is referred to as a process to train an AI/ML Model by learning the input/output relationship in a data driven manner and obtain the trained AI/ML Model for inference.

As used herein, the term "AI/ML model Inference" is referred to as a process of using a trained AI/ML model to produce a set of outputs based on a set of inputs.

As used herein, the term "AI/ML model validation" is referred to as a subprocess of training, to evaluate the quality of an AI/ML model using a dataset different from one used for model training, that helps selecting model parameters that generalize beyond the dataset used for model training.

As used herein, the term "AI/ML model testing" is referred to as a subprocess of training, to evaluate the performance of a final AI/ML model using a dataset different from one used for model training and validation. Differently from AI/ML model validation, testing does not assume subsequent tuning of the model.

As used herein, the term "UE-side (AI/ML) model" is referred to as an AI/ML Model whose inference is performed entirely at the UE.

As used herein, the term "Network-side (AI/ML) model" is referred to as an AI/ML Model whose inference is performed entirely at the network.

As used herein, the term "One-sided (AI/ML) model" is referred to as a UE-side (AI/ML) model or a network-side (AI/ML) model.

As used herein, the term "Two-sided (AI/ML) model" is referred to as a paired AI/ML Model(s) over which joint inference is performed, where joint inference comprises AI/ML Inference whose inference is performed jointly across the UE and the network, i.e., the first part of inference is firstly performed by UE and then the remaining part is performed by gNB, or vice versa.

As used herein, the term "AI/ML model transfer" is referred to as a delivery of an AI/ML model over the air interface, either parameters of a model structure known at the receiving end or a new model with parameters. Delivery may contain a full model or a partial model.

As used herein, the term "Model download" is referred to as a model transfer from the network to UE.

As used herein, the term "Model upload" is referred to as a model transfer from UE to the network.

As used herein, the term "Federated learning/federated training" is referred to as a machine learning technique that trains an AI/ML model across multiple decentralized edge nodes (e.g., UEs, gNBs) each performing local model training using local data samples. The technique requires multiple interactions of the model, but no exchange of local data samples.

As used herein, the term "Offline field data" is referred to as a data collected from field and used for offline training of the AI/ML model.

As used herein, the term "Online field data" is referred to as a data collected from field and used for online training of the AI/ML model.

As used herein, the term "Model monitoring" is referred to as a procedure that monitors the inference performance of the AI/ML model.

As used herein, the term "Supervised learning" is referred to as a process of training a model from input and its corresponding labels.

As used herein, the term "Unsupervised learning" is referred to as a process of training a model without labelled data.

As used herein, the term "Semi-supervised learning" is referred to as a process of training a model with a mix of labelled data and unlabeled data.

As used herein, the term "Reinforcement Learning (RL)" is referred to as a process of training an AI/ML model from input (a.k.a. state) and a feedback signal (a.k.a. reward) resulting from the model's output (a.k.a. action) in an environment the model is interacting with.

As used herein, the term "Model activation" is referred to as enable an AI/ML model for a specific function.

As used herein, the term "Model deactivation" is referred to as a disable an AI/ML model for a specific function.

As used herein, the term "Model switching" is referred to as a deactivating a currently active AI/ML model and activating a different AI/ML model for a specific function.

As described above, an AI/ML model may be applied in the NR radio interface to assist model functionalities or communication-related functions, such as, channel state information (CSI) feedback overhead reduction, improved accuracy, prediction, or beam management, enhanced positioning, and the like. For example, the AI/ML-based beam management targets spatial and/or time beam prediction for overhead and latency reduction, and/or beam selection accuracy improvement. The AI/ML based functionality needs to be improved.

In some mechanisms, for UE-side models and/or UE-part of two-sided models, it is proposed to define and study a (set of) applicable conditions for functionalities/models. Applicable conditions may be used to enable development of scenario/configuration/site-specific models, and, if needed, report the models' applicability to the Network. Whether and how to define performance targets (possibly as a part of applicable conditions) for functionality/models needs to be considered. Whether and how UE reports a (set of) applicable conditions for supported functionalities (and if needed, for supported models) and/or supported set of functionalities needs to be considered.

In some mechanisms, general aspects of AI/ML framework consider the issue of dynamic capabilities to be signalled in addition to static capabilities. However, it only considers the context but lacks any method to solve this issue.

In some mechanisms, the mechanism/signaling to handle UE capabilities dynamically for AI/ML enabled features, e.g., in the presence of handover is proposed. For example, dynamic UE capability reports some terms like this can be found.

In some mechanisms, for life cycle management (LCM), it is proposed the possibility that the network may be allowed to configure an AI/ML model that is not available at the UE side with possible model transfer/delivery pending and model transfer/delivery finished signalling indications.

In some mechanisms, the network (e.g., next generation (NG)-radio access network (RAN)) may be allowed to configure an AI/ML model that is not available at the UE.

In some mechanisms, the following signaling may be supported if the network is allowed to configure the supported models at the UE but not available at the UE for immediate use: model transfer/delivery pending indication, if the configured model is not available at the UE, and/or model transfer/delivery FINISHED indication, when the configured model is ready for use at the UE.

In some mechanisms, for those use cases the benefits need to be evaluated (utilizing developed methodology and defined key performance indicators (KPIs)) and potential impact on the specifications need to be assessed including physical (PHY) layer aspects, protocol aspects.

The AIML requires the UE to support one or more logical ML models supporting a given use case (e.g., CSI compression, beam prediction, positioning) needs to be considered.

Each logical ML model may further be implemented by the UE with one or more physical ML models with different architecture and implementation choices.

UE vendor may consider UE capabilities representing logical ML model but may not have a physical ML model for a given capability combination for example, whether the physical ML model may be downloaded only at the time the feature requires to be configured. This means that whether UE capability is statically represented by logical ML model but can dynamically change due to absence or presence of associated physical model.

When a UE downloads a ML model it may acquire a new functionality and it must indicate this to the network to allow the network to configure the newly acquired functionality.

Usually, the practice RAN2 has had is to either use some kind of assistance information or new capability exchange triggered from non-access stratum (NAS) layer. At this point network can trigger a new configuration i.e., principle is that radio resource control (RRC) configuration follows capability transfer and never otherwise.

Typically, UE performs a detach and reattach when RAT capabilities are impacted, for example forcing a capability exchange procedure. A main issue is that transferring/delivering a model to the UE results in a change in its capabilities. Therefore, it needs to identify a mechanism that doesn't allow for the abuse/overload of the capability exchange procedure (or the UAI or something else). The abuse/overload means that the signalling procedure causes a significant control plane signalling overhead on the network as each capability enquiry procedure may require the UE to detach and attach to the network which requires the registration procedure to be executed every time and this is quite inefficient as it involves tens of signalling messages.

In order to solve at least part of the above problems or other potential problems, a solution on capability information transmission is proposed. According to example embodiments, a second apparatus (for example, a network device) transmits, to a first apparatus (for example, a terminal device), a capability enquiry comprising ML capabilities with one or more applicable conditions and an indication requesting the first apparatus to indicate support of at least one activation condition for the applicable conditions. In response to receiving the capability enquiry, the first apparatus transmits, to the second apparatus, capability information comprising the applicable conditions and the at least one activation condition for the applicable conditions. The at least one activation condition indicates whether a corresponding applicable condition is currently supported or not supported.

In this manner, the second apparatus can be informed of the applicable condition and the activation condition for the applicable condition. The second apparatus can thus control the update of the ML capability such as an ML model. The performance of the ML capability can thus be enhanced.

Principle and implementations of the present disclosure will be described in detail below with reference to FIGS. 1A-10.

FIG. 1A illustrates an example communication environment 100 in which example embodiments of the present disclosure can be implemented. In the communication environment 100, a plurality of communication devices, including a first apparatus 110 and a second apparatus 120 can communicate with each other.

In the example of FIG. 1A, the second apparatus 120 has a certain coverage range, which may be called as a serving area or a cell 102. The first apparatuses 110 are located in the cell covered by the second apparatus 120. In the communication environment 100, the second apparatus 120 may communicate data and control information to the first apparatus 110 and the first apparatus 110 may also communication data and control information to the second apparatus 120.

In some example embodiments, a model functionality such as an AI/ML based functionality may be provided for the first apparatus 110. The functionality may be provided by one or more AI/ML models, such as a model 130. The model 130 may be implemented at the first apparatus 110, or the second apparatus 120, or both of the first apparatus 110 and the second apparatus 120.

The model 130 may be a logical model supporting functionality for a given use case (e.g., CSI compression, beam prediction, positioning). As used herein, the term "logical model" may be referred to as an association between an input and an output learned from training data, and thus a corresponding output may be generated for a given input after the training. The generation of the model may be based on a ML technique. The ML techniques may also be referred to as AI techniques. In general, a ML model can be built, which receives input information and makes predictions based on the input information. As used herein, a model is equivalent to an AI/ML model or a ML model, or a data-driven/data processing algorithm/procedure.

A logical model may be implemented by the first apparatus 110 and/or the second apparatus 120 with one or more physical ML models with different architecture and implementation choices. As used herein, the term "physical model" may be referred to as a physical element or unit which implements an operation or data processing of the logical model. In the following, unless explicitly stated, the term "model" may be referred to as a logical model.

It is to be understood that although a single model 130 is shown in FIG. 1A, there may be a plurality of models implemented by the first apparatus 110 and/or the second apparatus 120 to implement a model functionality.

It is to be understood that the number of apparatuses and their connections shown in FIG. 1A are only for the purpose of illustration without suggesting any limitation. The communication environment 100 may include any suitable number of apparatuses configured to implementing example embodiments of the present disclosure.

In the following, for purpose of illustration, some example embodiments are described with the first apparatus 110 operating as a terminal device and the second apparatus 120 operating as a network device. However, in some example embodiments, operations described in connection with a terminal device may be implemented at a network device or other device, and operations described in connection with a network device may be implemented at a terminal device or other device.

In some example embodiments, if the first apparatus 110 is a terminal device and the second apparatus 120 is a network device, the model 130 implemented at the first apparatus 110 may be referred to as a UE-side model, the model 130 implemented at the second apparatus 120 may be referred to as a network (NW) side model, and the model 130 implemented at the both sides may be referred to as a two-side model.

In some example embodiments, if the first apparatus 110 is a terminal device and the second apparatus 120 is a network device, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 1B:
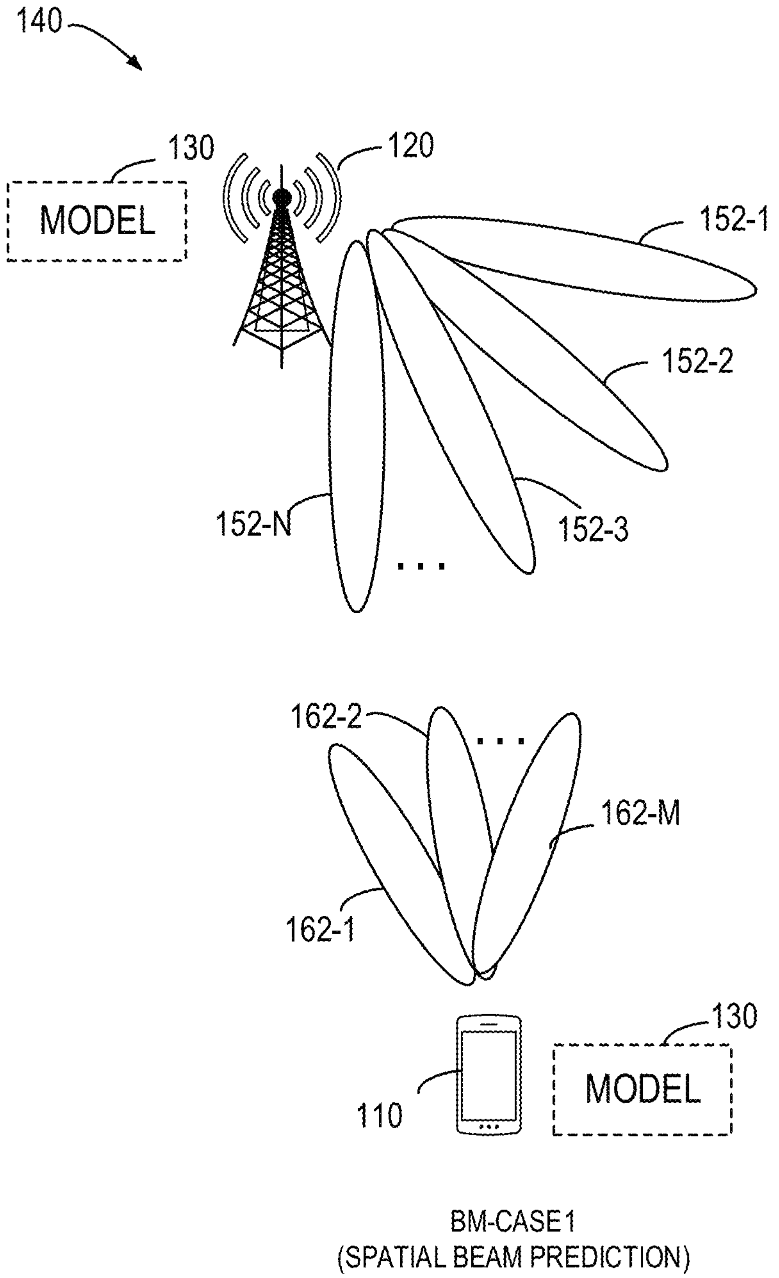

As briefly mentioned, the model 130 may provide various model functionalities. FIG. 1B illustrates an example communication environment 140 in which example embodiments of the present disclosure can be implemented. In the example of FIG. 1B, the model functionality may include an AI/ML based beam management (BM).

As illustrated in FIG. 1B, the second apparatus 120 transmits downlink transmission to the first apparatus 110 via one or more of beams 152-1, 152-2, 152-3, . . . , and 152-N (N being an integer greater than or equal to 1). For purpose of discussion, the beams 152-1, 152-2, 152-3, and 152-N are collectively or individually referred to as beam 152.

Correspondingly, in uplink, the first apparatus 110 transmits uplink transmission to the second apparatus 120 via the beams 162-1, 162-2, . . . , and 162-M (M being an integer greater than or equal to 1). For purpose of discussion, the beams 162-1, 162-2, . . . , and 162-M are collectively or individually referred to as beam 162.

In the communication environment 140, the model 130 implemented at the first apparatus 110 and/or the second apparatus 120 may perform an AI/ML based beam management (BM) such as a spatial beam prediction (also referred to as BM-Case1). The spatial beam prediction is to predict one or more best Tx beams or Tx-Rx beam pairs or corresponding reference signal received power (RSRP) values in different spatial locations. For example, the spatial beam prediction may be a DL Tx beam prediction which may be considered as a P1/P2 joint optimization, or a DL Tx-Rx beam pair prediction which may be considered as a P1/P2/P3 joint optimization.

Figure 1C:
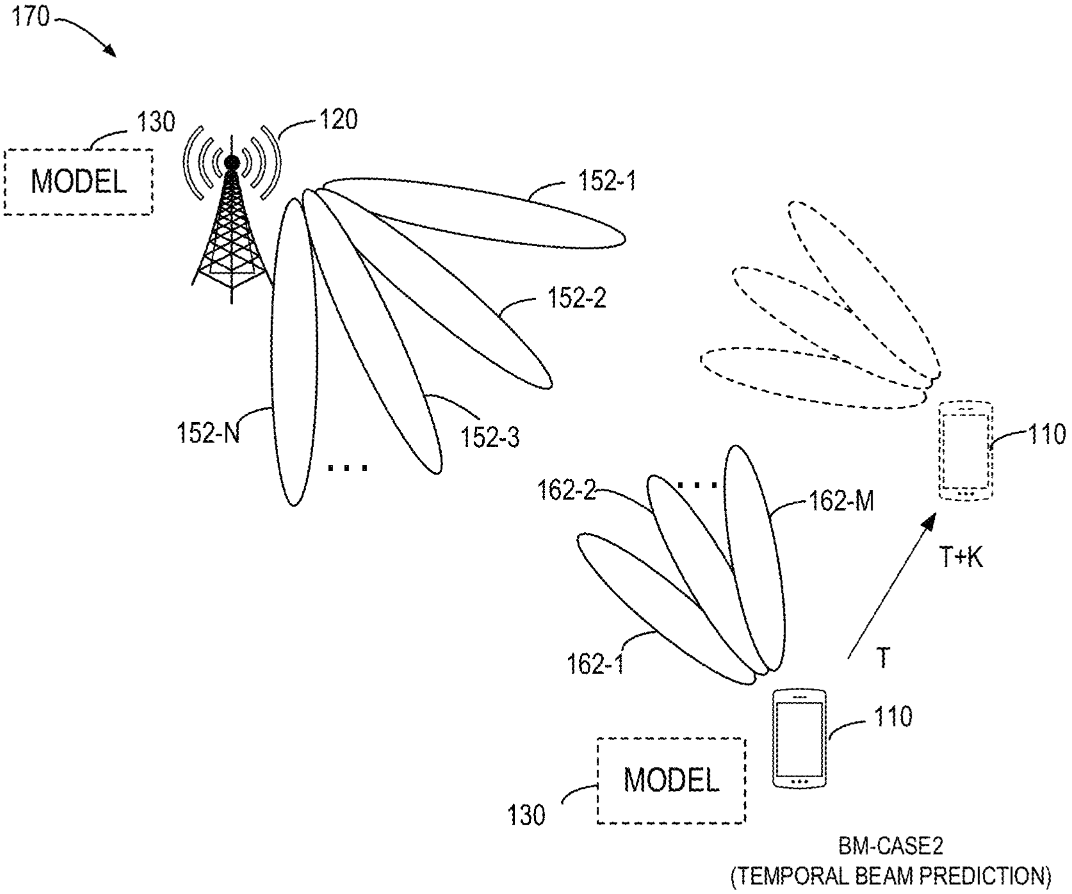

FIG. 1C illustrates an example communication environment 170 in which example embodiments of the present disclosure can be implemented. In the example of FIG. 1C, the model 130 implemented at the first apparatus 110 and/or the second apparatus 120 may perform an AI/ML based beam management (BM) such as a time-domain beam predictions (also referred to as BM-Case2). The time-domain beam prediction aims to predict the best Tx beams or Tx-Rx beam pairs to use for next time instants. e.g., beam prediction in the spatial domain (BM-Case1) for next time instants. For example, the time-domain beam prediction may be a DL Tx beam prediction which may be considered as a P1/P2 joint optimization, or a DL Tx-Rx beam pair prediction which may be considered as a P1/P2/P3 joint optimization.

As illustrated, the first apparatus 110 may move from a first location at time instant T to a second location at time instant T+K. The best Tx beams or Tx-Rx beam pairs to use for next time instants T+K may be predicted by the model 130 based on measurements at time instant T or any other time instants before the time instant T+K.

Compared with legacy beam management procedures (such as P1, P2, or P3) which requires time-consuming operation of sweeping all the Tx and Rx beams by configuring the first apparatus with a large number of synchronization signal block (SSB)/channel state information (CSI)-reference signals (RSS) measurements, the AI/ML-assisted beam management illustrated with respect to FIG. 1B and FIG. 1C can achieve overhead savings and latency reduction. For example, the beam prediction accuracy related key performance indicators (KPIs) (such as prediction accuracy, or RSRP difference) can be improved. In addition, system performance related KPIs, including throughput of the first apparatus 110, control signal overhead, and power consumption can be enhanced.

It is to be understood that in some example embodiments, the model 130 may perform both the spatial beam prediction shown in FIG. 1B and the time-domain beam prediction shown in FIG. 1C.

Figure 2:
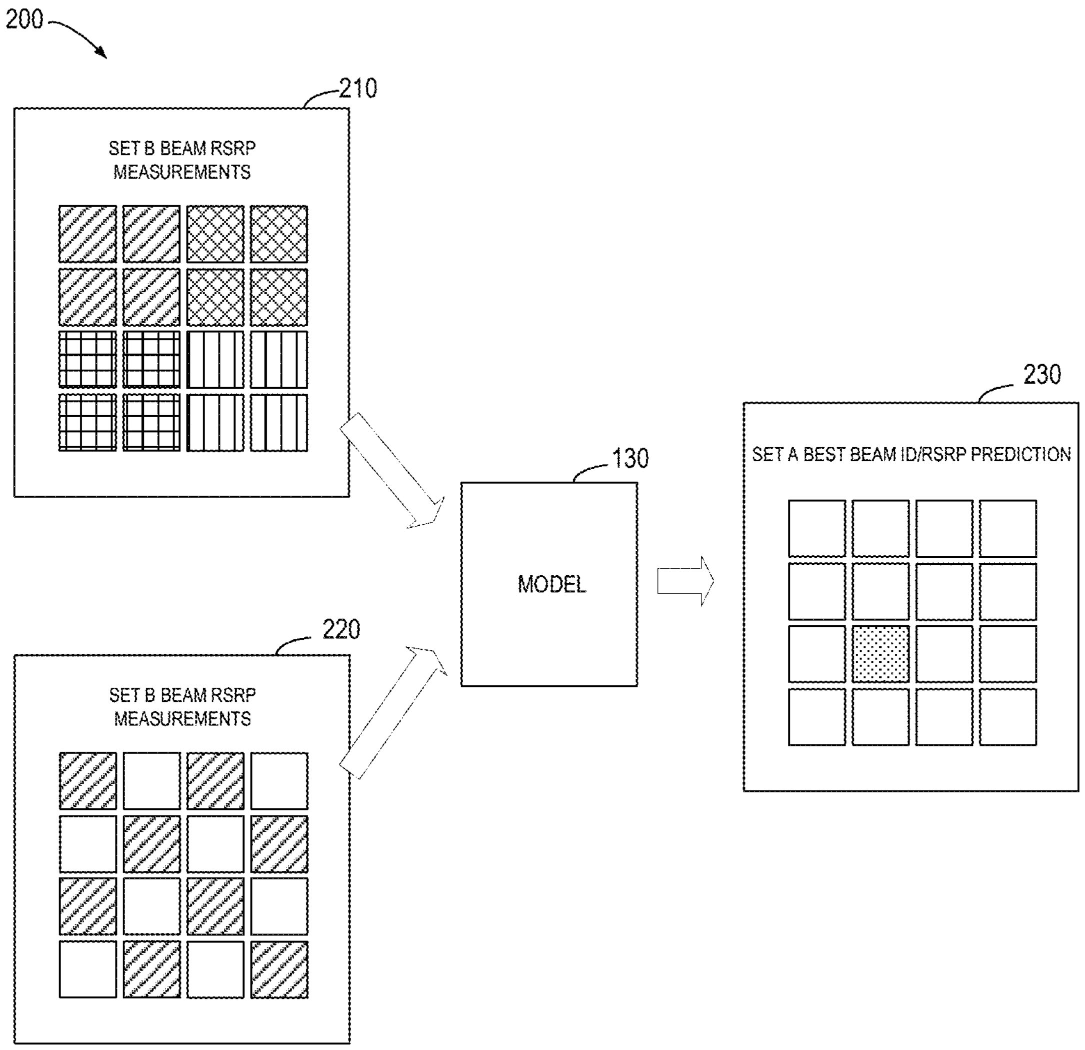
FIG. 2 illustrates an example configuration for AI/ML based beam management.

In some example embodiments, for different model functionalities, different configuration may be configured for the model 130. For example, the model 130 may be configured to receive different data or information input. FIG. 2 illustrates an example configuration 200 for AI/ML based beam management.

In some example embodiments, the model 130 may perform training or run the inference to predict Set A beams or Top-K of Set A beams, or RSRP of the Set A or Top-K of Set A. The Set A beams may be referred to as a set of candidate beams. Top-K of Set A beams may be a subset of Set A beams. The at least one predicted beam, at least one predicted first beam, and/or at least one predicted second beam may be the predicted Set A or a subset of Set A.

Measurement results of Set B beams may be used to predict Set A beams. That is, the Set B beam RSRP measurements may be inputted to the model 130. In an example, Set B may be different from Set A. For example, Set B represents set of wide beams and Set A represents set of narrow beams. As shown in FIG. 2, the model input 210 corresponds to the Set B beam RSRP measurements corresponding to a Set B different from Set A.

In another example, Set B beams may be subset of Set A, such as a subset of narrow beams. As shown in FIG. 2, the model input 220 corresponds to the Set B beam RSRP measurements corresponding to a subset of Set A. In a further example, Set B beams may be the same as Set A beams (not shown).

In some example embodiments, assistance information may be further inputted to the model 130, including but not limited to beam shape information, beam identifier (ID), or the like.

In the example of beam management, the output 230 of the model may include a best narrow beam ID or a best narrow beam RSRP. In addition, a quality of service (QOS) value for beam selection may be determined by the model 130.

The model 130 may be pretrained or trained. For example, the model 130 may be trained with model training data from offline 5G system level simulator.

Several example embodiments of the AI/ML based functionality have been described with respect to FIGS. 1A-1C. For purpose of illustration, some example embodiments hereinafter will be described with the beam prediction as the model functionality. It is to be understood that the model functionality may also be any other suitable functions, including but not limited to CSI prediction, positioning prediction, or the like. Scope of the present disclosure is not limited in this regard.

In some example embodiments, the model 130 may be a logical model which is configured to implement the model functionality. In some example embodiments, an applicable condition for supported functionality/functionalities of a given sub-use case (ML-enabled feature) needs to be identified. As used herein, the term “applicable condition” or “condition” may refer to a condition to determine whether a corresponding functionality is applied. This means that the UE capability is statically represented by logical ML model but can dynamically change due to absence or presence of associated physical model. This difference is important to note as a logical model capability could be quite advanced (for example, as agreed for example during standardization discussions), for example supporting many combinations of different parameters representing the capability of the underlying AIML use case, but in practice the physical model may only implement a subset of the capabilities of the logical model due to practical/implementation restrictions. Furthermore, the support of this subset will often change/update dynamically as time evolves.

As briefly mentioned, a solution on capability information transmission is proposed. According to example embodiments, a second apparatus (for example, a network device) transmits, to a first apparatus (for example, a terminal device), a capability enquiry comprising ML capabilities with one or more applicable conditions and an indication requesting the first apparatus to indicate support of at least one activation condition for the applicable conditions. In response to receiving the capability enquiry, the first apparatus transmits, to the second apparatus, capability information comprising the applicable conditions and the at least one activation condition for the applicable conditions. The at least one activation condition indicates whether a corresponding applicable condition is currently supported or not supported.

In this manner, the second apparatus can be informed of the applicable condition and the activation condition for the applicable condition. The second apparatus can thus control the update of the ML capability such as an ML model. The performance of the ML capability can thus be enhanced.

Figure 3:
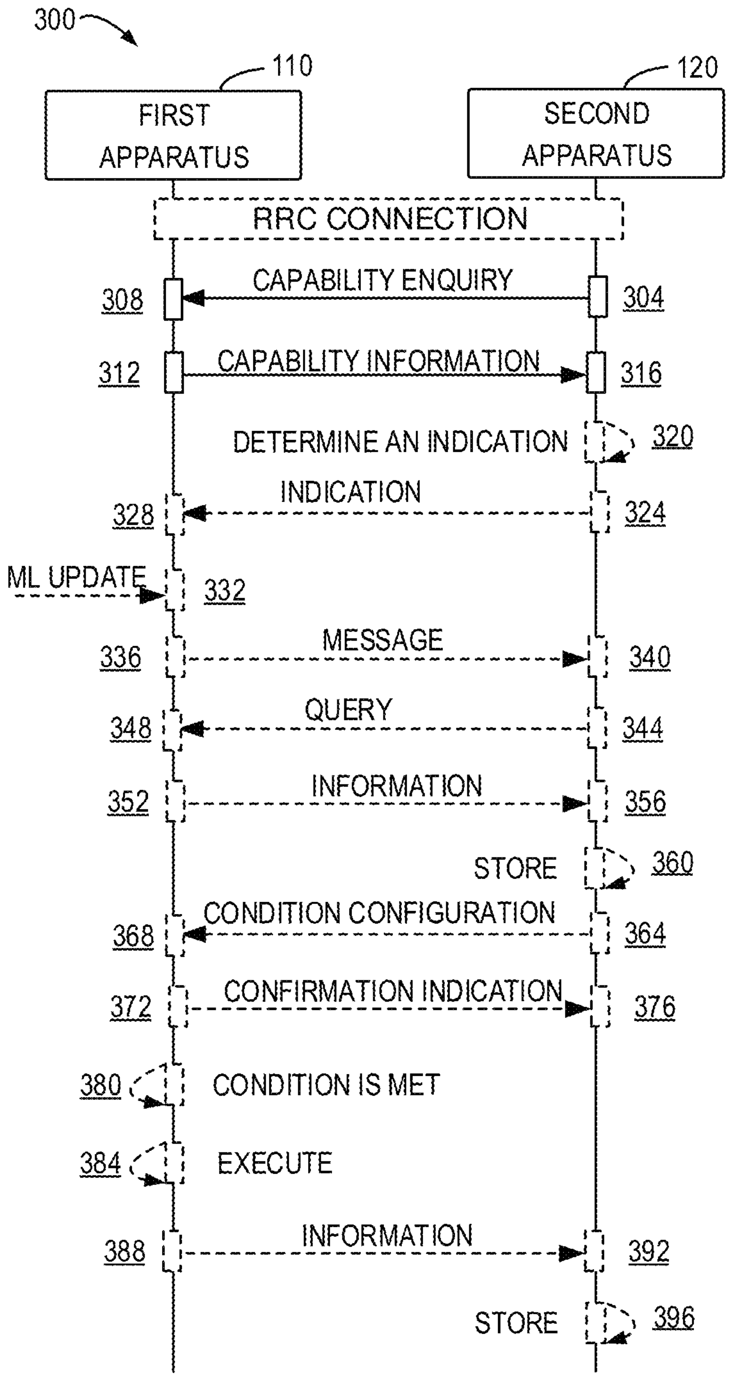
FIG. 3 illustrates a signaling flow for capability information transmission according to some example embodiments of the present disclosure.

FIG. 3 illustrates a signaling flow 300 for capability information transmission according to some example embodiments of the present disclosure. The signaling flow 300 involves the first apparatus 110 and the second apparatus 120 in FIG. 1A. For purpose of illustration, the signaling flow 300 will be described by referring to FIG. 1A.

Although a single first apparatus 110 and a single second apparatus 120 are illustrated in FIG. 3, it would be appreciated that there may be a plurality of apparatuses performing similar operations as described with respect to the first apparatus 110 or the second apparatus 120 below.

It is noted that example embodiments of the present disclosure can be applied to any proper scenarios or use cases, for example, beam management, positioning accuracy enhancement, or CSI. Only for purpose of illustrations, example embodiments of the present disclosure are described with reference to the scenario or use case of beam management.

In operation, the second apparatus 120 transmits (304) a capability enquiry to the first apparatus 110. The capability enquiry includes ML capabilities with one or more applicable conditions and an indication requesting the first apparatus 110 to indicate support of at least one activation condition for the applicable conditions. For example, the capability enquiry may be a request to include the ML capabilities with dynamic applicable conditions. The first apparatus 110 receives (308) the capability enquiry.

As used herein, the term "activation condition" may refer to a condition to activate a corresponding applicable condition. For example, if an activation condition for an applicable condition is met, the applicable condition may be activated or enabled. Otherwise, the applicable condition may be inactivated or disabled. An example of this is if the underlying capability is dependent on a discontinuous reception (DRX) parameter or if the UE is moving faster than a speed (e.g., 30 kmph) or if a given number of component carriers are enabled (across different frequency bands), etc.

In response to receiving (308) the capability enquiry, the first apparatus 110 transmits (312) capability information to the second apparatus 120. The capability information includes the applicable conditions and the at least one activation condition for the applicable conditions. The at least one activation condition indicates whether a corresponding applicable condition is currently supported or not supported. The second apparatus 120 receives (316) the capability information. For example, the first apparatus 110 may transmit (312) the capability information for each applicable condition combination together with the at least one activation condition for the applicable conditions, and additional information if these applicable conditions are currently supported or not supported.

Figure 4A:
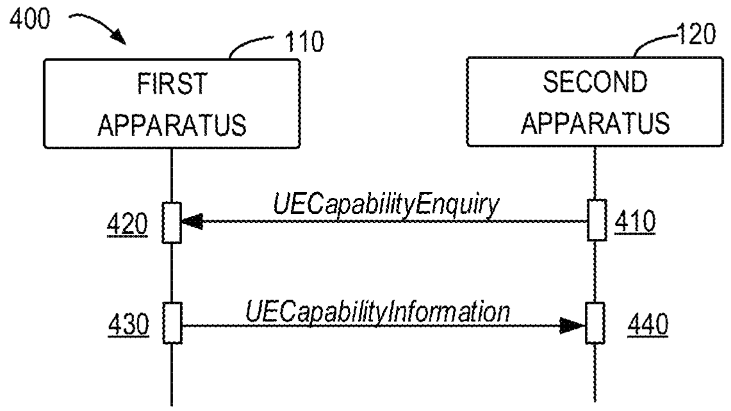
FIG. 4A and FIG. 4B illustrate example signaling flows between the first and second apparatuses according to some example embodiments of the present disclosure, respectively.

In some example embodiments, the transmission (304)/reception (308) of the capability enquiry and the transmission (312)/reception (316) of the capability information may be via any suitable signaling. FIG. 4A illustrates an example signaling flow 400 between the first apparatus 110 and the second apparatus 120. As shown, the second apparatus 120 may transmit (410) UECapabilityEnquiry to the first apparatus 110. The first apparatus 110 receives (420) the UECapabilityEnquiry. The capability enquiry is included in the UECapabilityEnquiry.

In response to receiving (420) the UECapabilityEnquiry, the first apparatus 110 may transmit (430) UECapabilityInformation to the second apparatus 120. The second apparatus 120 may receive (440) the UECapabilityInformation. The UECapabilityInformation includes the capability information.

Such static signaling between the first apparatus 110 and the second apparatus 120 may allow the network to query UE per-radio access technology (RAT) capabilities. Furthermore, the request may include a filter to shape the size of the capability container. The filtering allows to cut down the number of bands, band combinations, component carrier specific properties.

Such transmission/reception of the capability information may be usually done once when the first apparatus 110 gets international mobile subscriber identification number (IMSI) attached to the network as the procedure is a heavy on an air interface capacity.

Reference is now back to FIG. 3. In some example embodiments, the first apparatus 110 is in a connected mode such as RRC_CONNECTED. The second apparatus 120 may fetch the capabilities (here the context is for the ML specific ones) of the first apparatus 110 in RRC_CONNECTED mode.

Figure 4B:
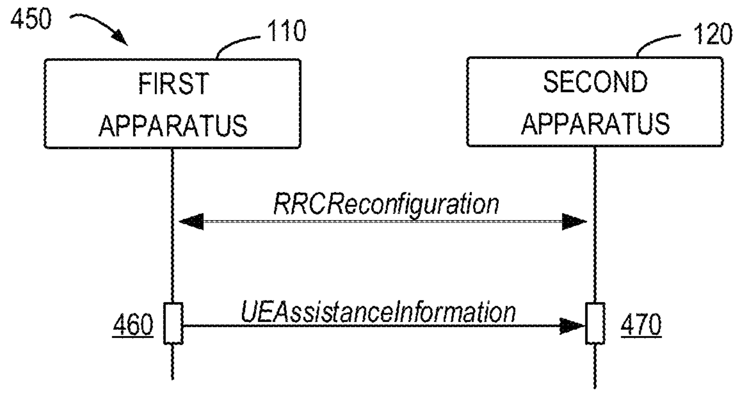

FIG. 4B illustrates another example signaling flow 450 between the first apparatus 110 and the second apparatus 120 in RRC_CONNECTED mode. For example, RRCReconfiguration may be transmitted/received between the first apparatus 110 and the second apparatus 120. The first apparatus 110 may transmit (460) UEAssistanceInformation to the second apparatus 120. The second apparatus 120 may receive (470) the UEAssistanceInformation. The UEAssistanceInformation may include further information regarding the capability information. By using the semi-static UEAssistanceInformation signaling, it allows the network to configure the first apparatus 110 to report temporary changes to the static capabilities. For example, temporary changes may be due to overheating, multi-universal subscriber identity module (MUSIM) operation, dual connectivity restrictions e.g., power limitations etc. A gap may be needed. It allows the first apparatus 110 to indicate the need for gaps in RRC reconfiguration complete.

Still referring to FIG. 3, in some example embodiments, different applicable condition may be configured for different supported functionalities of various use case (or sub-use case). As used herein, a use case or sub-use case may be referred to as a ML-enabled feature or FG. The applicable conditions for supported functionality/functionalities of a given sub-use case (ML-enabled feature) may be identified. In Functionality identification and functionality-based LCM, knowing the conditions of the first apparatus 110 (including parameters/configurations) is required at the second apparatus 120 as the first step prior to any other step, as this may reveal the background conditions when using ML models for supporting a given ML-enabled feature. These applicable conditions may be depended on different sub-use cases.

In some example embodiments, at least a common set of applicable conditions (i.e., the definitions of the parameters are common, but the parameter values might be different depending on the Functionality or Feature) may be derived across all sub-use cases that are under discussion.

Figure 5:
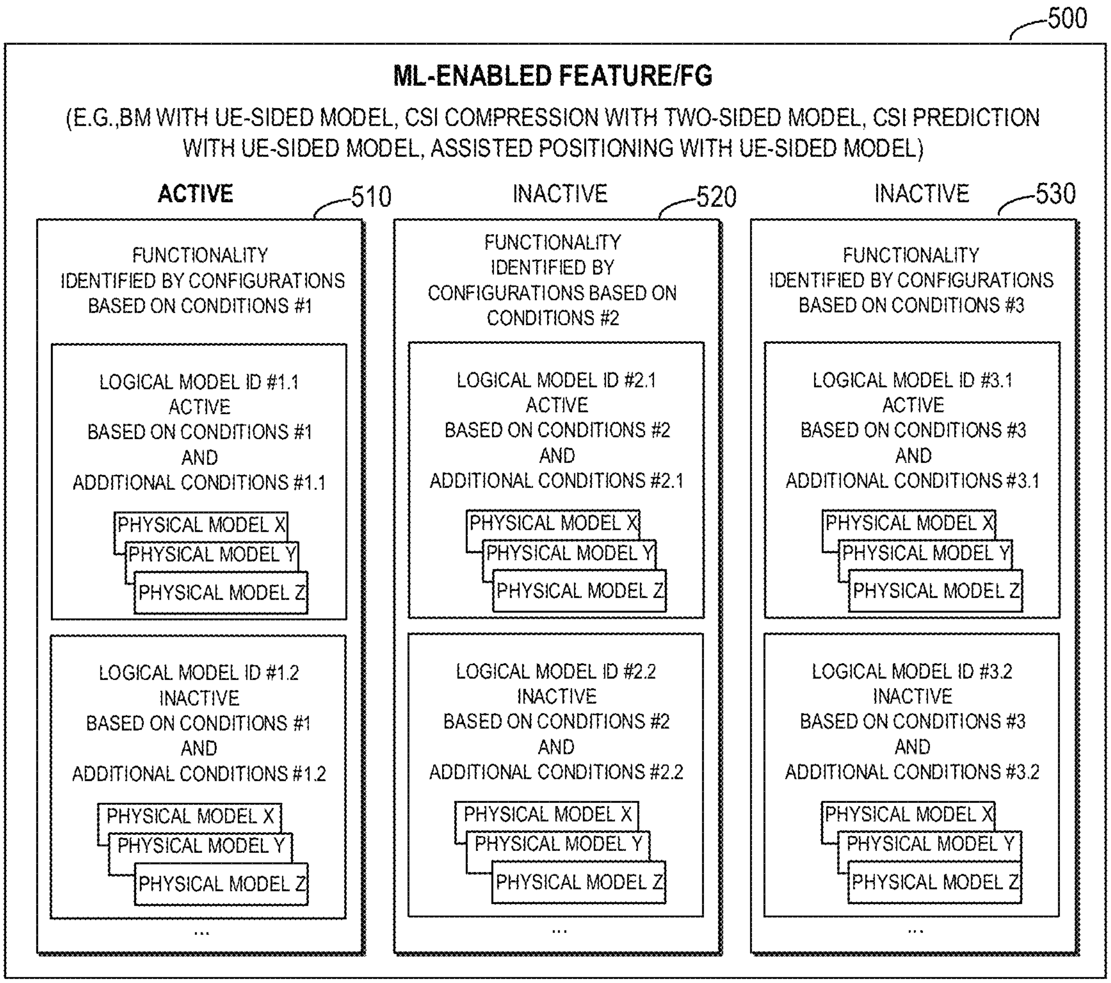
FIG. 5 illustrates an example diagram showing ML-enabled feature according to some example embodiments of the present disclosure.

FIG. 5 illustrates an example diagram 500 showing ML-enabled feature according to some example embodiments of the present disclosure. For example, the block 510 illustrates a functionality identified by configurations based on conditions #1. For another example, the block 520 illustrates a functionality identified by configurations based on conditions #2. For a further example, the block 530 illustrates a functionality identified by configurations based on conditions #3.

The potential use of the applicable conditions is shown in FIG. 5. Each functionality may be identified by a subset of applicable conditions, which does not prevent individual applicable conditions to be re-used in different sets and/or different functionalities.

Several example applicable conditions for different use cases will be described in the following Table 1 to Table 3. Table 1 illustrates example applicable conditions for BM-Case 1. Table 2 illustrates example applicable conditions for CSI-Compression. Table 3 illustrates example applicable conditions for Positioning Case 1, such as a direct AI/ML positioning based on channel impulse response (CIR) (AI/ML_direct_DL_CIR UEside).

TABLE 1

| Applicable conditions for BM-Case1 | |
|---|---|
| **Applicable Condition** | **Description** |
| 1. Support Top-K DL Tx beam prediction (K = 1, 2, 4, [8]). | This defines the support of predicting best-K non-zero power (NZP) CSI-RS resources based on SSB and/or CSI-RS-based RSRP measurements. |
| 2. Set B conditions | Measured DL RS (SSB, CSI-RS, SSB and CSI-RS)<br>Defines support of using SSB and/or CSI-RS-based RSRP measurements.<br>Measured DL RS set dimension (4, 8, 12, [16])<br>Indicates the minimum number of NZP-CSI-RS resources that shall be measured and used by the UE for predicting best-K NZP CSI-RS resources.<br>Measured DL RS set pattern (e.g., fixed, pre-configured list, random).<br>Indicates the limitations on the set pattern for Set B conditions. |
| 3. Set A conditions | Predicted DL RS (CSI-RS)<br>Defines support of predicting CSI-RS resources.<br>Predicted DL RS set dimension (16, 32, 64)<br>Indicates the maximum number of NZP-CSI-RS resources that shall be configured as the prediction NZP-CSI-RS resource set. |
| 4. NW-side performance monitoring conditions | Support measurements of Predicted DL RS set (full Set A, partial Set A).<br>Defines the support of measuring the NZP-CSI-RS resources that correspond to Set A.<br>Measurement periodicity (100 ms, 200 ms).<br>Indicates the minimum periodicity when supporting NZP-CSI-RS resources that correspond to Set A. |
| 5. Conditions on supporting ML functionalities | Max number of supported functionalities (1, 2, 4, 8,)<br>Indicates the maximum number of functionalities (e.g., number of parameter combinations that enable ML-enabled feature) that can be configured toward the UE.<br>Delay in activating a functionality (2 ms, 4 ms, . . . )<br>Indicates the delay required when activating or switching a functionality.<br>Generalization condition of functionalities (true, false).<br>Indicates that the UE supports any functionality configured considering the parameter combinations of 1-4 and can be used towards the UE without any validation of whether the functionality is applicable or not. |

TABLE 2

| Applicable conditions for CSI-Compression | |
|---|---|
| **Applicable Condition** | **Description** |
| 1. CSI-RS conditions | Maximum number of simultaneously active CSI-RS ports/resources.<br>Maximum number of simultaneously active CSI-RS ports/resources for each AI/ML-based CSI type.<br>Defines the maximum number of CSI-RS ports/resources that can be simultaneously active per band or per band combination. "Simultaneous" for CSI-RS means, in any slot, the number of active CSI-RS resources/ports. |
| 2. CSI-RS and CSI reports configuration conditions | Maximum number of configured CSI-RS/IM ports/resources (e.g., in CSI-RS-IM-ReceptionForFeedback).<br>Maximum number of configured CSI Report Settings (e.g., in csi-ReportFramework).<br>Defines the maximum number of CSI-RS/IM ports/resources and CSI Report Settings that can be configured per BWP (regardless of whether they are active). |
| 3. CSI calculation conditions (i.e., number of occupied CPUs) | Defines the maximum number of CPUs that can be simultaneously occupied by all CSI or beam reports in any given symbol. |
| 4. Output CSI conditions | Defines the supported definitions/conditions on the output CSI, including:<br>Compression ratio (CR) conditions (e.g., CR4, CR8, . . . ).<br>Defines the supported compression ratios of the compressed CSI codebook supported by the UE.<br>Quantizer conditions (e.g., SQ1, VQ1, . . . ).<br>Defines the supported quantization modes for compressed CSI codebook supported by the UE. |
| 5. Pairing ID(s) (e.g., model ID(s), | Indicates pairing ID(s) (interpretable by the NW) to match the UE side and NW side models. One pairing ID can be reported |

TABLE 2-continued

| Applicable conditions for CSI-Compression | |
|---|---|
| Applicable Condition | Description |
| dataset ID(s)) | by a bit field defined in the spec (e.g., 3 or 4 bits) which allows NW to consider selecting a matching model on the NW side. |
| 6. Conditions on supporting ML functionalities | Max number of supported functionalities (1, 2, 4, 8, . . . ) Indicates the maximum number of functionalities (e.g., number of parameter combinations that enable ML-enabled feature) that can be configured toward the UE. Delay in activating a functionality (2 ms, 4 ms, . . . ) Indicates the delay required when activating or switching a functionality. Generalization condition of functionalities (true, false) Indicates that the UE supports any functionality configured considering the parameter combinations of 1-4 and can be used towards the UE without any validation whether functionality is applicable or not. |

TABLE 3

| Applicable conditions for Positioning Case 1 | |
|---|---|
| Applicable Condition | Description |
| 1. Supported N't (N't = 64, 128, 256, 512) | Indicates the N't values that the UE is capable to consider in AIML_direct_DL_CIR_UEside positioning. Note: $N'_t$ is the number of the first time domain samples for the CIR input parameter. |
| 2. Supported N_port (N_port = 1, 2, 4) | Indicates the N_port is the number of transmit/receive antenna port pairs to consider in AIML_direct_DL_CIR_UEside positioning. Note: the antenna port is a logical entity that can be connected to different physical antennas. |
| 3. Supported N_TRP (N_TRP = 1, 2, . . . , 72) | Indicates the number of N_TRP, which is the number of TRPs to consider for AIML_direct_DL_CIR_UEside positioning. |
| 4. Supported set conditions for measured DL PRS | Defines support of using DL PRS based CIR measurements for AIML_direct_DL_CIR_UEside. |
| 5. Supported performance monitoring conditions | Defines the minimum periodicity to report performance monitoring for AIML_direct_DL_CIR_UEside. |
| 6. Supported estimated CIR quantization reporting | Defines the discrete characteristics of the CIR for AIML_direct_DL_CIR_UEside. |
| 7. Conditions on supporting ML functionalities | Max number of supported functionalities (1, 2, 4, 8, . . . ) Indicates the maximum number of functionalities (e.g., number of parameter combinations that enable ML-enabled feature) that can be configured toward the UE. Delay in activating a functionality (2 ms, 4 ms, . . . ) Indicates the delay required when activating or switching a functionality. Generalization condition of functionalities (true, false) Indicates that the UE supports any functionality configured considering the parameter combinations of 1-4 and can be used towards the UE without any validation whether functionality is applicable or not. |

In some example embodiments, a logical ML model may serve a specific ML enabled use case (e.g., CSI compression, beam management, positioning, channel prediction/charting, etc.). The logical ML model may support a set of applicable conditions (or capabilities) for example shown in Table 1-Table 3. In some example embodiments, applicable conditions may be combined into different combinations. For example, the applicable conditions are numbered #1 to #4, that is, totally 4 combinations as shown in Table 4.

TABLE 4

| | Applicable condition | | | |
|---|---|---|---|---|
| | #1 | #2 | #3 | #4 |
| Support Top K DL Tx beam prediction | 1 | 1, 2 | 1, 2, 4 | 1, 2, 4, 8 |
| Set B conditions (Measured RS, DL RS set dimension, DL RS set pattern) | SSB 4 Fixed | SSB 4, 8 Fixed | SSB, CSI-RS 4, 8, 12 Fixed, pre-configured | SSB, CSI-RS 4, 8, 12, 16 Fixed, pre-configured, random |
| Set A conditions (Predicted DL RS, DL RS set dimensions) | SSB 16 | SSB 16 | SSB, CSI-RS 16, 32 | SSB, CSI-RS 16, 32, 64 |
| NW-side performance monitoring conditions (predicted DL RS set, periodicity) | full Set A 100 msec | full Set A 100 msec | full Set A, partial set A 100, 200 msec | full Set A, partial set A 100, 200 msec |
| Delay in activation | 4 msec | 4 msec | 2 msec | 2 msec |

Several example applicable conditions and applicable condition combinations have been described with respect to Table 1-Table 4. Referring back to FIG. 3, the first apparatus 110 may transmit (312) the capability information for each applicable condition combination together with the at least one activation condition for the applicable condition and additional information if these applicable conditions are currently supported or not supported.

In some example embodiments, a physical ML model supports one or more applicable conditions and represents the binary/executable of the ML functionality supporting a given logical ML model. Often due to practical implementation reasons like the use of a specific deep neural network (DNN) structure e.g., convolutional neural network (CNN), long short-term memory (LSTM) or residual network (ResNet), it may happen that the physical ML model cannot be generalized. For example, the physical ML model may not support all the applicable conditions pertaining to the logical ML model or it may be restricted in performance to given applicable condition in a given scenario (e.g., a cell tied to a specific deployment e.g., frequency range 1 (FR1) or FR2, or for beam prediction uses a different beam codebook that results in a different relationship between Set A and Set B across two different cells). This may result in a physical model having the ability to support a given applicable condition.

In some example embodiments, the applicable conditions may be associated with different physical ML models. For example, it may not have the physical ML model to support all the combinations. For another example, the capability of a physical ML model might be impacted in a given deployment condition e.g., a cell or location.

Taking Table 1 as an example, a first group of applicable conditions including Measured DL RS (SSB), Measured DL RS set dimension (4, 8), Measured DL RS set pattern (e.g., fixed, pre-configured list), Predicted DL RS set dimension (16), Support measurements of Predicted DL RS set (full Set A), Measurement periodicity (100 ms), Max number of supported functionalities (1, 2), and Delay in activating a functionality (2 ms) is supported. A second group of applicable conditions including Measured DL RS (CSI-RS), Measured DL RS set dimension (12), Predicted DL RS set dimension (32), Support measurements of Predicted DL RS set (partial Set A), Max number of supported functionalities (4), and Delay in activating a functionality (4 ms) is also supported.

However, a third group of applicable conditions including Measured DL RS (SSB and CSI-RS), Measured DL RS set dimension (16), Measured DL RS set pattern (random), Predicted DL RS set dimension (64), Measurement periodicity (200 ms), Max number of supported functionalities (8) needs to download the physical ML model to acquire these capabilities. Therefore, an activation condition may be configured for the third group of applicable conditions. As the third group of applicable conditions is associated with a same physical ML model, the third group of applicable conditions may be considered as an applicable condition combination or considered as a single applicable condition.

Figure 6:
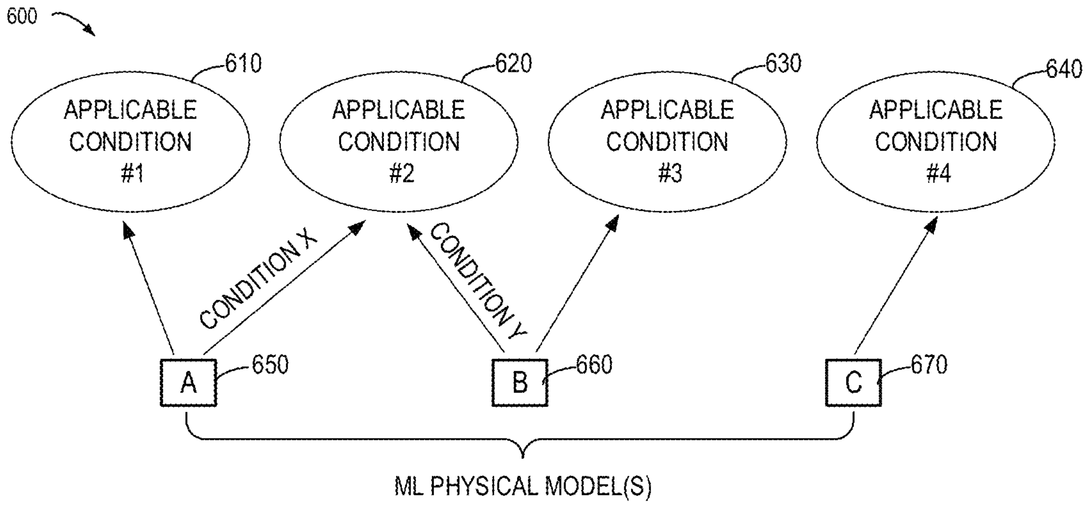
FIG. 6 illustrates an example applicable condition-based mapping of logical to physical model(s) according to some example embodiments of the present disclosure.

FIG. 6 illustrates an example applicable condition-based mapping 600 of logical to physical model(s) according to some example embodiments of the present disclosure. As illustrated, a plurality of applicable conditions 610, 620, 630 and 640 may be configured for a physical model A 650, a physical model B 660, and a physical model C 670. It is to be understood that the applicable condition shown in FIG. 6 may be a single applicable condition or an application condition combination. Scope of the present is not limited here.

The physical model A 650 may support applicable condition 610. The physical model A 650 may also support applicable condition 620 if it meets condition X. The condition X may be referred to as an activation condition for the application condition 610. By way of example, the condition X may be that discontinuous reception (DRX) is not configured.

Likewise, if a condition Y is met, the physical model B 660 may support the applicable condition 620. The condition Y is an activation condition for the applicable condition. By way of example, the condition X may be that the speed of the first apparatus 110 is lower than 30 kmph.

The physical model B 660 may support the applicable condition 630 without any activation condition for the applicable condition 630. The physical model C 670 may support the application condition 640 without any activation condition for the applicable condition 640.

The mapping 600 may also be shown by Table 5 below.

TABLE 5

| Physical Model | Applicable combination with conditions |
|---|---|
| A | #1 and #2 (Condition X) |
| B | #2 (Condition Y) and #3 |
| C | #4 |

It is to be understood that the mapping 600 and example activation conditions described with respect to FIG. 6 and Table 5 bare only for the purpose of illustration, without suggesting any limitation. Based on the capability information received (316) from the first apparatus 110, the mapping 600 can be determined.

Referring back to FIG. 3, in some example embodiments, the capability information may be updated. The updating of the capability information may be triggered by the second apparatus 120.

In some example embodiments, the second apparatus 120 may determine (320) an indication indicating which applicable condition the second apparatus 120 is interested to monitor for changes. The indication may also be referred to as a notification.

The second apparatus 120 may transmit (324) the indication to the first apparatus 110. The first apparatus 110 may receive (328) the indication. The indication may be included in an uplink trigger or a message. By way of example, the indication may be transmitted (324)/received (328) via a medium access control (MAC) or RRC message, or any other suitable signaling.

In this way, the second apparatus 120 configures the first apparatus 110 with a notification about which applicable conditions network is interested to monitor for changes. For example, the Condition X and Condition Y may be set or when the first apparatus 110 is capable of Applicable Condition #4.

The illustrated signaling between the first apparatus 110 and the second apparatus 120 can dynamically adapt the applicable conditions based on the network control. In this way, the second apparatus 120 can setup a notification-based approach rather than require the first apparatus 110 to detach/attach when the first apparatus 110 gains or loses capability to support the listed applicable conditions. Dynamic applicable conditions can thus be retrieved, and the notification can be configured for further updates.

In some example embodiments, an ML update may be received (332) by the first apparatus 110 via over the top (OTT) i.e., from an external server that is transparent to the radio access network (i.e., gNB) adding/updating a physical ML model to the UE impacting the capabilities of the UE. If one of the at least one activation condition is met, the first apparatus 110 may transmit (336) a message to the second apparatus 120 to indicate the met activation condition. The second apparatus 120 may receive (340) the message.

In some example embodiments, the second apparatus 120 may transmit (344) a query for a subset of the applicable conditions to the first apparatus 110. The first apparatus 110 may receive (348) the query. For example, if Condition X is met, for example, the first apparatus 110 may format a message to indicate this to the second apparatus 120. The second apparatus 120 may decide to filter the amount of requests if it is interested only in a subset of the updates. For example, the second apparatus 120 may choose to activate the functionality corresponding to a subset of the updates and hence it would smartly avoid receiving all the updates from the first apparatus 110 saving signalling capacity on the air interface.

In some example embodiments, the first apparatus 110 may transmit (352) information about the subset of the applicable conditions to the second apparatus 120. The second apparatus 120 may receive (356) the information. The second apparatus 120 may further store (360) the received (356) information.

That is, the first apparatus 110 may provide the updated applicable conditions and the second apparatus 120 may store them for further use and use them for potentially configuring the features pertaining to the newly updated applicable conditions. If the first apparatus 110 gets an ML model that enables a suspended applicable condition, the suspended applicable condition can be unsuspended with the signaling between the first apparatus 110 and the second apparatus 120.

Alternatively, or in addition, in some example embodiments, no matter whether the operations 320 to 360 are performed, the first apparatus 110 may be provided with conditional reconfiguration for a suspended underlying applicable condition. For example, the second apparatus 120 may transmit (364) a conditional reconfiguration message to the first apparatus 110. The conditional reconfiguration message includes an activation condition configured for one of the applicable conditions. The first apparatus 110 receives (368) the conditional reconfiguration message. By way of example, the conditional reconfiguration message may be included in a RRC reconfiguration message as shown in FIG. 4B.

The second apparatus 120 may decide to provide the first apparatus 110 with a conditional reconfiguration message with an activation condition for example, that if Condition X is met (e.g., DRX is activated), start using the functionality configured in the RRC reconfiguration message. The second apparatus 120 may further provide a monitoring configuration as part the conditional reconfiguration message to ensure that the first apparatus 110 validates the functionality before taking it into use.

In some example embodiments, the first apparatus 110 may transmit (372) a confirmation indication to indicate that the first apparatus 110 acknowledges the reconfigured activation condition, for example, to the second apparatus 120. The second apparatus 120 may receive (376) the confirmation indication. The confirmation indication may be referred to as an acknowledge (ACK). By way of example, the confirmation indication may be included in a RRC reconfiguration complete message.

The first apparatus 110 may determine (380) whether the at least activation condition is met. If the first apparatus 110 determines (380) that a first activation condition of the at least activation condition is met, the first apparatus 110 may execute (384) conditional reconfiguration for the first activation condition. Likewise, the first apparatus 110 may determine (380) whether each activation condition is met. If a certain activation condition is met, the first apparatus 110 may execute (384) conditional reconfiguration for the certain activation condition. That is, if an activation condition is met, the first apparatus 110 executes (384) the conditional reconfiguration message.

In some example embodiments, the first apparatus 110 may transmit (388) to the second apparatus 120, information about updating of the first activation condition and one or more updated applicable conditions corresponding to the first activation condition. The second apparatus 120 may receive (392) the information. By way of example, the information may be included in a RRC reconfiguration complete message. The second apparatus 120 may store (396) the information.

That is, the first apparatus 110 may provide the updated applicable conditions. The second apparatus 120 may store them for further use and use them for potentially reconfiguring the features pertaining to the newly updated applicable conditions.

With the signaling flow 300, the network views the ML functionality from a logical standpoint. Configured events allow the network to smoothly take the impacted applicable conditions into account. It allows the network to be in full control even when physical models are added/modified/removed in the UE. The network is able to take the entire radio capability into account, which includes model updates. By using such notification-based approach instead of triggering the reattach based on the entire radio capability, the abuse of the capability exchange procedure can be thus reduced.

In addition, sudden gain/loss/update of capabilities in a very dynamic manner are synchronized with the network. That is, network vendor can avoid surprises that configured functionality fails or is impacted without notice.

Moreover, UE does not have to detach/attach. This is important not only from 5G+ advanced features but also the 6G standards where AI/ML features are no longer low-hanging fruit but many features in the UE will be ML assisted and we need a better mechanism to handle ML capability exchange.

In this way, the air interface with features enabling support of AI/ML-based algorithms for enhanced performance and/or reduced complexity/overhead can be augmented. By augmenting the air-interface with features, it enables improved support of AI/ML-based algorithms for enhanced performance and/or reduced complexity/overhead. The enhanced performance may include but not limited to improved throughput, robustness, accuracy or reliability, etc.

It is to be noted that the example functionalities or use cases are only for purpose of illustration, other use cases and applications might also be addressed. In some example embodiments, sufficient use cases may be considered to enable the identification of a common AI/ML framework, including functional requirements of AI/ML architecture, which may be used in subsequent projects. Areas where AI/ML may improve the performance of air-interface functions may also be identified.

Figure 7:
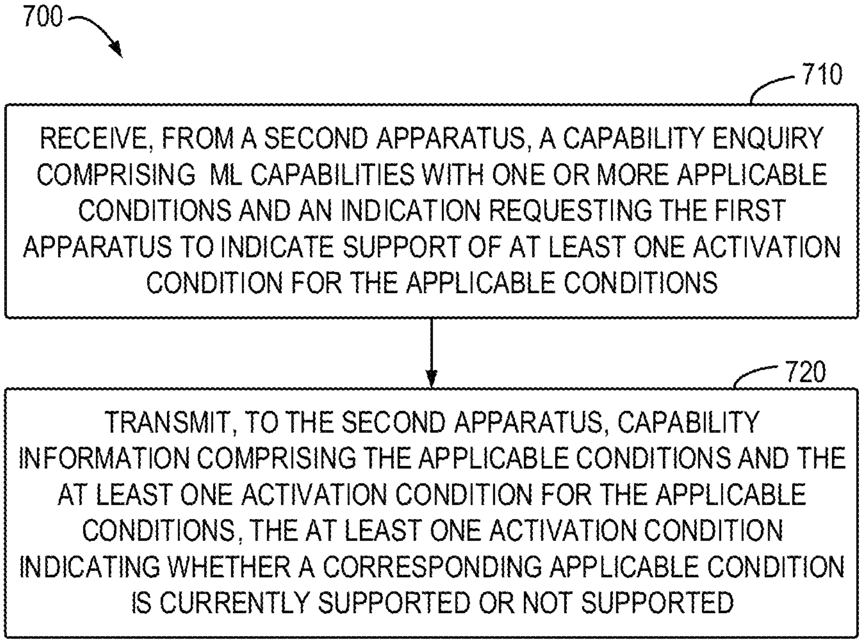
FIG. 7 illustrates a flowchart of a method implemented at a first apparatus according to some example embodiments of the present disclosure.

FIG. 7 shows a flowchart of an example method 700 implemented at a first apparatus in accordance with some example embodiments of the present disclosure. For the purpose of discussion, the method 700 will be described from the perspective of the first apparatus 110 in FIG. 1A.

At block 710, the first apparatus 110 receives, from a second apparatus, a capability enquiry comprising Machine Learning, ML, capabilities with one or more applicable conditions and an indication requesting the first apparatus to indicate support of at least one activation condition for the applicable conditions.

At block 720, the first apparatus 110 transmits, to the second apparatus, capability information comprising the applicable conditions and the at least one activation condition for the applicable conditions, the at least one activation condition indicating whether a corresponding applicable condition is currently supported or not supported.

In some example embodiments, the method 700 further comprises: receiving, from the second apparatus, an indication indicating which applicable condition the second apparatus is interested to monitor for changes.

In some example embodiments, the indication is comprised in an uplink trigger or a message.

In some example embodiments, the method 700 further comprises: in accordance with a determination that one of the at least one activation condition is met, transmitting a message to the second apparatus to indicate the met activation condition.

In some example embodiments, the method 700 further comprises: receiving, from the second apparatus, a query for a subset of the applicable conditions; and transmitting information about the subset of the applicable conditions to the second apparatus.

In some example embodiments, the method 700 further comprises: receiving, from the second apparatus, a conditional reconfiguration message comprising an activation condition reconfigured for one of the applicable conditions.

In some example embodiments, the method 700 further comprises: transmitting a confirmation indication to indicate that the first apparatus acknowledges the reconfigured activation condition.

In some example embodiments, the method 700 further comprises: in accordance with a determination that a first activation condition of the at least activation condition is met, executing conditional reconfiguration for the first activation condition.

In some example embodiments, the method 700 further comprises: transmitting, to the second apparatus, information about updating of the first activation condition and one or more updated applicable conditions corresponding to the first activation condition.

In some example embodiments, the first apparatus comprises a terminal device, and the second apparatus comprises a network device.

Figure 8:
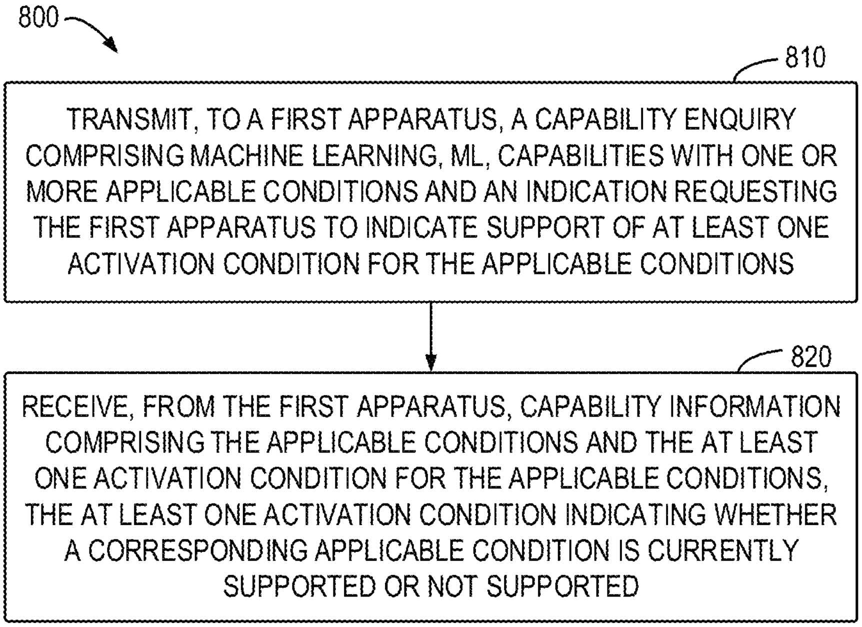
FIG. 8 illustrates a flowchart of a method implemented at a second apparatus according to some example embodiments of the present disclosure.

FIG. 8 shows a flowchart of an example method 800 implemented at a second apparatus in accordance with some example embodiments of the present disclosure. For the purpose of discussion, the method 800 will be described from the perspective of the second apparatus 120 in FIG. 1A.

At block 810, the second apparatus 120 transmits, to a first apparatus, a capability enquiry comprising Machine Learning, ML, capabilities with one or more applicable conditions and an indication requesting the first apparatus to indicate support of at least one activation condition for the applicable conditions.

At block 820, the second apparatus 120 receives, from the first apparatus, capability information comprising the applicable conditions and the at least one activation condition for the applicable conditions, the at least one activation condition indicating whether a corresponding applicable condition is currently supported or not supported.

In some example embodiments, the method 800 further comprises: transmitting, to the first apparatus, an indication indicating which applicable condition the second apparatus is interested to monitor for changes.

In some example embodiments, the indication is comprised in an uplink trigger or a message.

In some example embodiments, the method 800 further comprises: receiving, from the first apparatus, a message indicating which activation condition is met.

In some example embodiments, the method 800 further comprises: transmitting, to the first apparatus, a query for a subset of the applicable conditions; and receiving, from the first apparatus, information about the subset of the applicable conditions.

In some example embodiments, the method 800 further comprises: storing the subset of the applicable conditions.

In some example embodiments, the method 800 further comprises: transmitting, to the first apparatus, a conditional reconfiguration message comprising an activation condition reconfigured for one of the applicable conditions.

In some example embodiments, the method 800 further comprises: receiving, from the first apparatus, a confirmation indication to indicate that the first apparatus acknowledges the reconfigured activation condition.

In some example embodiments, the method 800 further comprises: receiving, from the first apparatus, information about updating of the first activation condition and one or more updated applicable conditions corresponding to the first activation condition; and storing the received information.

In some example embodiments, the first apparatus comprises a terminal device, and the second apparatus comprises a network device.

In some example embodiments, a first apparatus capable of performing any of the method 700 (for example, the first apparatus 110 in FIG. 1A) may comprise means for performing the respective operations of the method 700. The means may be implemented in any suitable form. For example, the means may be implemented in a circuitry or software module. The first apparatus may be implemented as or included in the first apparatus 110 in FIG. 1A.

In some example embodiments, the first apparatus comprises means for receiving, from a second apparatus, a capability enquiry comprising Machine Learning, ML, capabilities with one or more applicable conditions and an indication requesting the first apparatus to indicate support of at least one activation condition for the applicable conditions; and means for transmitting, to the second apparatus, capability information comprising the applicable conditions and the at least one activation condition for the applicable conditions, the at least one activation condition indicating whether a corresponding applicable condition is currently supported or not supported.

In some example embodiments, the first apparatus further comprises: means for receiving, from the second apparatus, an indication indicating which applicable condition the second apparatus is interested to monitor for changes.

In some example embodiments, the indication is comprised in an uplink trigger or a message.

In some example embodiments, the first apparatus further comprises: means for in accordance with a determination that one of the at least one activation condition is met, transmitting a message to the second apparatus to indicate the met activation condition.

In some example embodiments, the first apparatus further comprises: means for receiving, from the second apparatus, a query for a subset of the applicable conditions; and means for transmitting information about the subset of the applicable conditions to the second apparatus.

In some example embodiments, the first apparatus further comprises: means for receiving, from the second apparatus, a conditional reconfiguration message comprising an activation condition reconfigured for one of the applicable conditions.

In some example embodiments, the first apparatus further comprises: means for transmitting a confirmation indication to indicate that the first apparatus acknowledges the reconfigured activation condition.

In some example embodiments, the first apparatus further comprises: means for in accordance with a determination that a first activation condition of the at least activation condition is met, executing conditional reconfiguration for the first activation condition.

In some example embodiments, the first apparatus further comprises: means for transmitting, to the second apparatus, information about updating of the first activation condition and one or more updated applicable conditions corresponding to the first activation condition.

In some example embodiments, the first apparatus comprises a terminal device, and the second apparatus comprises a network device.

In some example embodiments, the first apparatus further comprises means for performing other operations in some example embodiments of the method 700 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 800 (for example, the second apparatus 120 in FIG. 1A) may comprise means for performing the respective operations of the method 800. The means may be implemented in any suitable form. For example, the means may be implemented in a circuitry or software module. The second apparatus may be implemented as or included in the second apparatus 120 in FIG. 1A.

In some example embodiments, the second apparatus comprises means for transmitting, to a first apparatus, a capability enquiry comprising Machine Learning, ML, capabilities with one or more applicable conditions and an indication requesting the first apparatus to indicate support of at least one activation condition for the applicable conditions; and means for receiving, from the first apparatus, capability information comprising the applicable conditions and the at least one activation condition for the applicable conditions, the at least one activation condition indicating whether a corresponding applicable condition is currently supported or not supported.

In some example embodiments, the second apparatus further comprises: means for transmitting, to the first apparatus, an indication indicating which applicable condition the second apparatus is interested to monitor for changes.

In some example embodiments, the indication is comprised in an uplink trigger or a message.

In some example embodiments, the second apparatus further comprises: means for receiving, from the first apparatus, a message indicating which activation condition is met.

In some example embodiments, the second apparatus further comprises: means for transmitting, to the first apparatus, a query for a subset of the applicable conditions; and means for receiving, from the first apparatus, information about the subset of the applicable conditions.

In some example embodiments, the second apparatus further comprises: means for storing the subset of the applicable conditions.

In some example embodiments, the second apparatus further comprises: means for transmitting, to the first apparatus, a conditional reconfiguration message comprising an activation condition reconfigured for one of the applicable conditions.

In some example embodiments, the second apparatus further comprises: means for receiving, from the first apparatus, a confirmation indication to indicate that the first apparatus acknowledges the reconfigured activation condition.

In some example embodiments, the second apparatus further comprises: means for receiving, from the first apparatus, information about updating of the first activation condition and one or more updated applicable conditions corresponding to the first activation condition; and means for storing the received information.

In some example embodiments, the first apparatus comprises a terminal device, and the second apparatus comprises a network device.

In some example embodiments, the second apparatus further comprises means for performing other operations in some example embodiments of the method 800 or the second apparatus 120. In some example embodiments, the means comprises at least one processor; and at least one memory storing instructions that, when executed by the at least one processor, cause the performance of the second apparatus.

Figure 9:
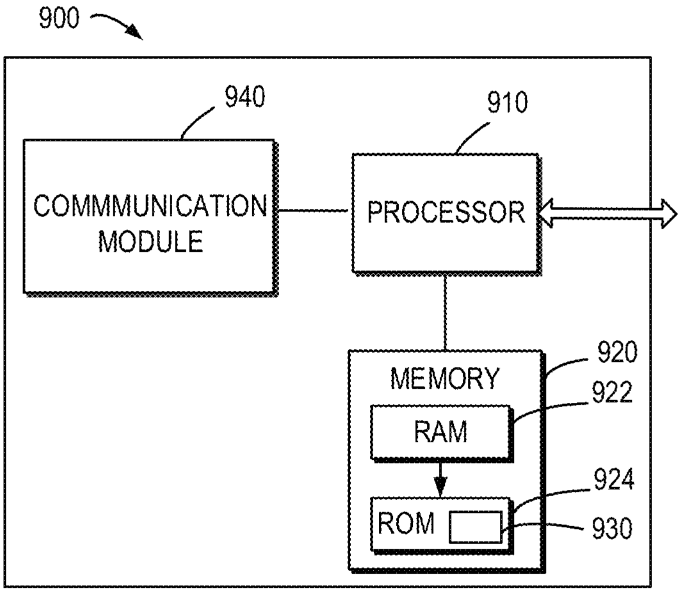
FIG. 9 illustrates a simplified block diagram of a device that is suitable for implementing example embodiments of the present disclosure.

FIG. 9 is a simplified block diagram of a device 900 that is suitable for implementing example embodiments of the present disclosure. The device 900 may be provided to implement a communication device, for example, the first apparatus 110 or the second apparatus 120 as shown in FIG. 1A. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The instructions of the program 930 may include instructions for performing operations/acts of some example embodiments of the present disclosure. The program 930 may be stored in the memory, e.g., the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIG. 3 to FIG. 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 10:
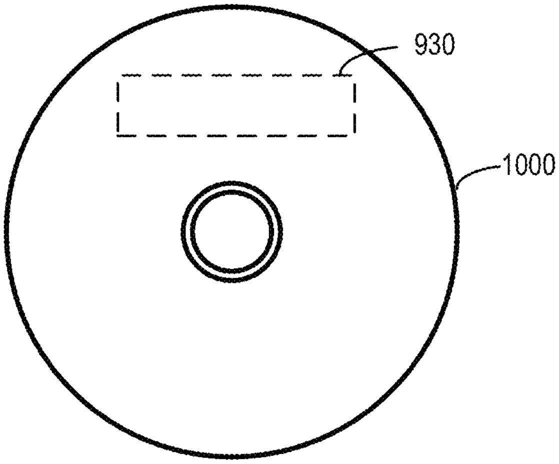
FIG. 10 illustrates a block diagram of an example computer readable medium in accordance with some example embodiments of the present disclosure.

FIG. 10 shows an example of the computer readable medium 1000 which may be in form of CD, DVD or other optical storage disk. The computer readable medium 1000 has the program 930 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

receive, from a second apparatus, a capability enquiry comprising Machine Learning (ML) capabilities with applicable conditions and an indication requesting the first apparatus to indicate support of activation conditions for the applicable conditions, that, when the activation conditions are met, functions corresponding to channel state information (CSI) overhead reduction, beam management (BM), and a direct artificial intelligence/machine learning (AI/ML) positioning based on channel impulse response (CIR) are enabled, wherein support for the activation conditions are based on a capability of the first apparatus being statically represented by a set of logical ML models and dynamically change due to absence or presence of associated physical model; and transmit, to the second apparatus, capability information comprising the applicable conditions and the activation conditions for the applicable conditions, the activation conditions indicating whether a corresponding applicable condition is currently supported or not supported;

without the first apparatus detaching:

transmit, to the second apparatus, changes to the applicable conditions due an absence of a first physical model corresponding to a first logical ML model in the set of logical ML models;

based on the changes, transmit, to the second apparatus, information about updating of a first activation condition and one or more updated applicable conditions corresponding to the first activation condition;

based on the updating, receive, from the second apparatus, a first conditional reconfiguration message comprising a first activation condition reconfigured for a first one of the applicable conditions; and in accordance with a determination that the first activation condition of the first one of the activation conditions is met by the first apparatus, execute the first conditional reconfiguration for the first activation condition and a corresponding first functionality;

transmit, to the second apparatus, temporary changes to applicable activation conditions due to overheating, multi-universal subscriber identity module (MUSIM) operation, dual connectivity restrictions, and power limitations of the first apparatus;

based on the temporary changes, receive, from the second apparatus, a second conditional reconfiguration message comprising a second activation condition reconfigured for a second one of the applicable conditions; and in accordance with a determination that the second activation condition of the second one of the activation conditions is met by the first apparatus, execute the second conditional reconfiguration for the second activation condition and a corresponding second functionality.

2. The first apparatus of claim 1, wherein the first apparatus is caused to:

receive, from the second apparatus, an indication indicating which applicable condition the second apparatus is interested to monitor for changes.

3. The first apparatus of claim 2, wherein the indication is comprised in an uplink trigger.

4. The first apparatus of claim 3, wherein the first apparatus is caused to:

in accordance with a determination that one of the activation conditions is met, transmit a message to the second apparatus to indicate the met activation condition.

5. The first apparatus of claim 4, wherein the first apparatus is caused to:

receive, from the second apparatus, a query for a subset of applicable activation conditions; and transmit information about the subset of the applicable conditions to the second apparatus.

6. The first apparatus of claim 5, wherein the first apparatus is caused to:

transmit a confirmation indication to indicate that the first apparatus acknowledges the reconfigured activation condition.

7. The first apparatus of claim 6, wherein the first apparatus is caused to:

transmit, to the second apparatus, information about updating of the first activation condition and one or more updated applicable conditions corresponding to the first activation condition.

8. The first apparatus of claim 7, wherein the first apparatus comprises a terminal device, and the second apparatus comprises a network device.

9. A system comprising:

a first apparatus:

at least one processor; and at least one memory storing instructions that, when executed by the at least one processor, cause the first apparatus at least to:

receive, from a second apparatus, a capability enquiry comprising Machine Learning (ML) capabilities with applicable conditions and an indication requesting the first apparatus to indicate support of activation conditions for the applicable conditions, that, when the activation conditions are met, functions corresponding to channel state information (CSI) overhead reduction, beam management (BM), and a direct artificial intelligence/machine learning (AI/ML) positioning based on channel impulse response (CIR) are enabled, wherein support for the activation conditions are based on a capability of the first apparatus being statically represented by a set of logical ML models and dynamically change due to absence or presence of associated physical model; and transmit, to the second apparatus, capability information comprising the applicable conditions and the activation conditions for the applicable conditions, the activation conditions indicating whether a corresponding applicable condition is currently supported or not supported;

without the first apparatus detaching:

transmit, to the second apparatus, changes to the applicable conditions due an absence of a first physical model corresponding to a first logical ML model in the set of logical ML models;

based on the changes, transmit, to the second apparatus, information about updating of a first activation condition and one or more updated applicable conditions corresponding to the first activation condition;

based on the updating, receive, from the second apparatus, a first conditional reconfiguration message comprising a first activation condition reconfigured for a first one of the applicable conditions; and in accordance with a determination that the first activation condition of the first one of the activation conditions is met by the first apparatus, execute the first conditional reconfiguration for the first activation condition and a corresponding first functionality;

transmit, to the second apparatus, temporary changes to applicable activation conditions due to overheating, multi-universal subscriber identity module (MUSIM) operation, dual connectivity restrictions, and power limitations of the first apparatus;

based on the temporary changes, receive, from the second apparatus, a second conditional reconfiguration message comprising a second activation condition reconfigured for a second one of the applicable conditions; and in accordance with a determination that the second activation condition of the second one of the activation conditions is met by the first apparatus, execute the second conditional reconfiguration for the second activation condition and a corresponding second functionality.

10. The system of claim 9, wherein the first apparatus is caused to:

receive, from the second apparatus, an indication indicating which applicable condition the second apparatus is interested to monitor for changes.

11. The system of claim 10, wherein the indication is comprised in an uplink trigger or a message.

12. The system of claim 11, wherein the first apparatus is caused to:

in accordance with a determination that one of the activation conditions is met, transmit a message to the second apparatus to indicate the met activation condition.

13. The system of claim 12, wherein the first apparatus is caused to:

receive, from the second apparatus, a query for a subset of applicable activation conditions; and transmit information about the subset of the applicable conditions to the second apparatus.

14. The system of claim 13, wherein the first apparatus is caused to:

transmit a confirmation indication to indicate that the first apparatus acknowledges the reconfigured activation condition.

15. The system of claim 14, wherein the first apparatus is caused to:

transmit, to the second apparatus, information about updating of the first activation condition and one or more updated applicable conditions corresponding to the first activation condition.

16. The system of claim 15, wherein the first apparatus comprises a terminal device, and the second apparatus comprises a network device.

17. A method comprising:

receiving, by a first apparatus from a second apparatus, a capability enquiry comprising Machine Learning (ML) capabilities with applicable conditions and an indication requesting the first apparatus to indicate support of activation conditions for the applicable conditions, that, when the activation conditions are met, functions corresponding to channel state information (CSI) overhead reduction, beam management (BM), and a direct artificial intelligence/machine learning (AI/ML) positioning based on channel impulse response (CIR) are enabled, wherein support for the activation conditions are based on a capability of the first apparatus being statically represented by a set of logical ML models and dynamically change due to absence or presence of associated physical model; and transmitting, to the second apparatus, capability information comprising the applicable conditions and the activation conditions for the applicable conditions, the activation conditions indicating whether a corresponding applicable condition is currently supported or not supported;

without the first apparatus detaching:

transmitting, to the second apparatus, changes to the applicable conditions due an absence of a first physical model corresponding to a first logical ML model in the set of logical ML models;

based on the changes, transmitting, to the second apparatus, information about updating of a first activation condition and one or more updated applicable conditions corresponding to the first activation condition;

based on the updating, receiving, from the second apparatus, a first conditional reconfiguration message comprising a first activation condition reconfigured for a first one of the applicable conditions; and in accordance with a determination that the first activation condition of the first one of the activation conditions is met by the first apparatus, executing the first conditional reconfiguration for the first activation condition and a corresponding first functionality;

transmitting, to the second apparatus, temporary changes to applicable activation conditions due to overheating, multi-universal subscriber identity module (MUSIM) operation, dual connectivity restrictions, and power limitations of the first apparatus;

based on the temporary changes, receiving, from the second apparatus, a second conditional reconfiguration message comprising a second activation condition reconfigured for a second one of the applicable conditions; and in accordance with a determination that the second activation condition of the second one of the activation conditions is met by the first apparatus, executing the second conditional reconfiguration for the second activation condition and a corresponding second functionality.

18. The method of claim 17, further comprising:

receiving, from the second apparatus, an indication indicating which applicable condition the second apparatus is interested to monitor for changes.

19. The method of claim 18, wherein the indication is comprised in an uplink trigger or a message.

20. The method of claim 19, further comprising:

in accordance with a determination that one of the activation conditions is met, transmitting a message to the second apparatus to indicate the met activation condition;

receiving, from the second apparatus, a query for a subset of applicable activation conditions; and transmitting information about the subset of the applicable conditions to the second apparatus.

* * * * *